No. 786,151. PATENTED MAR. 28, 1905.
J. M. RIBERT.
COFFEE MILL.
APPLICATION FILED OCT. 5, 1904.
2 SHEETS—SHEET 1.
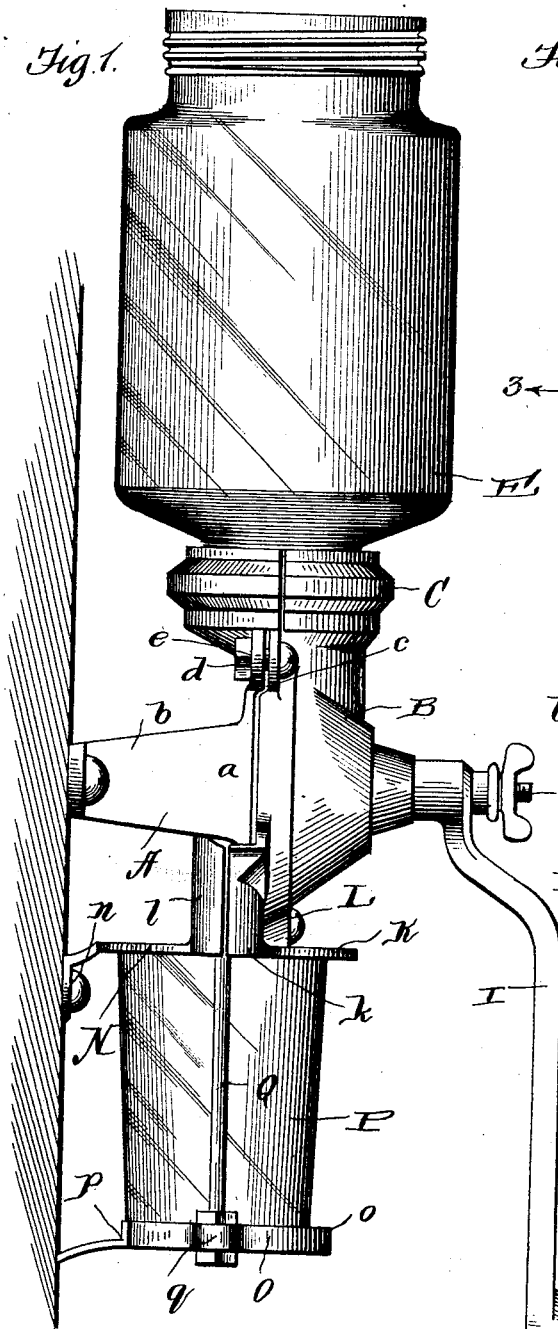
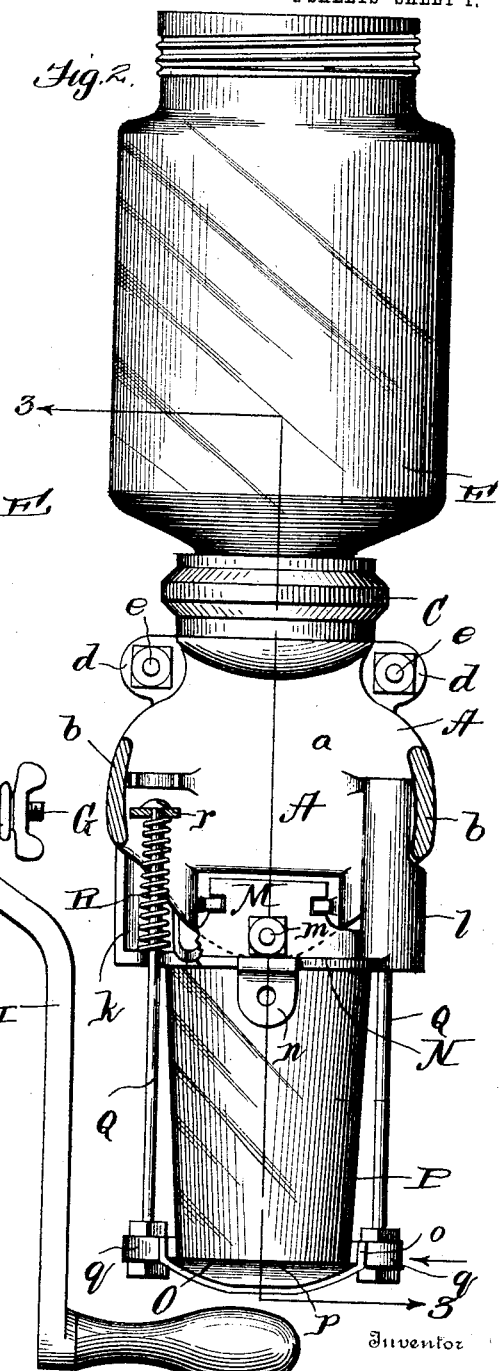
Witnesses
R. A. Boswell.
Albert Popkins
Inventor
Joseph M. Ribert
By Sturtevant & Greeley
Attorneys No. 786,151. PATENTED MAR. 28, 1905.
J. M. RIBERT.
COFFEE MILL.
APPLICATION FILED OCT. 5, 1904.
2 SHEETS—SHEET 2.
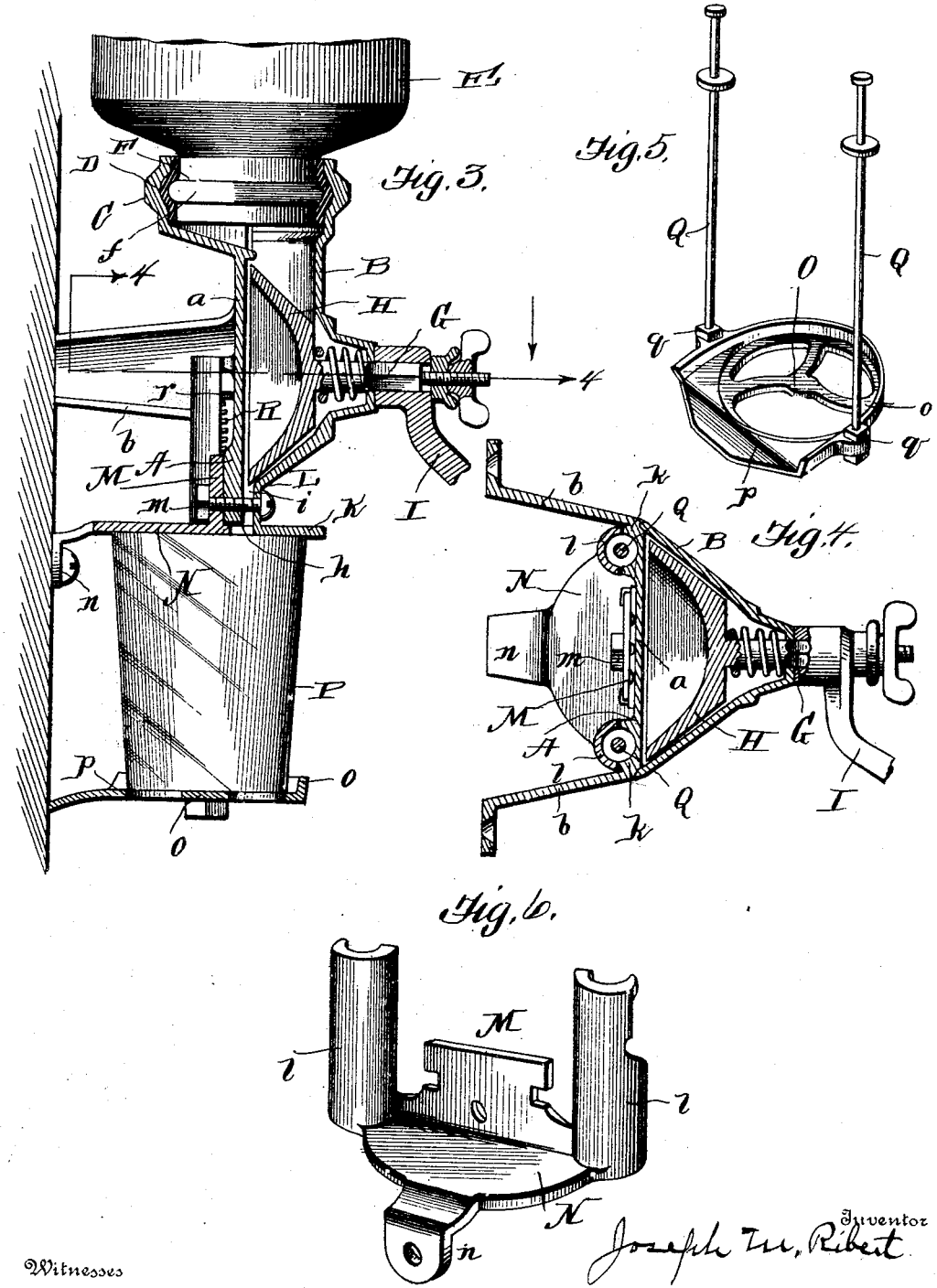
Witnesses
R. A. Boswell
Albert Popkins
Inventor
Joseph M. Ribert
By Sturtevant & Greeley
Attorneys No. 786,151.                                              Patented March 28, 1905.

UNITED STATES PATENT OFFICE.

JOSEPH M. RIBERT, OF NEW YORK, N. Y., ASSIGNOR TO NATIONAL NOVELTY CORPORATION, OF NEW YORK, N. Y., A CORPORATION OF NEW JERSEY.

COFFEE-MILL.

SPECIFICATION forming part of Letters Patent No. 786,151, dated March 28, 1905.

Application filed October 5, 1904. Serial No. 227,263.

*To all whom it may concern:*

Be it known that I, JOSEPH M. RIBERT, a citizen of the United States, residing at New York, in the county of New York, State of New York, have invented certain new and useful Improvements in Coffee-Mills, of which the following is a description, reference being had to the accompanying drawings, and to the letters of reference marked thereon.

My invention relates to an improvement in coffee-mills of that class in which the canister holding the unground coffee is attached to the mill proper and the receptacle to hold the ground coffee is removably placed upon a support attached to said mill proper.

The object of the present invention is to provide certain novel improvements in the construction of the mill proper whereby the cost is cheapened and the efficiency increased, to provide a novel means for securing the canister to the mill proper whereby breakage of the canister is less likely to occur than in the ordinary construction, and, finally, to provide certain novel arrangements for supporting the receptacles for the ground coffee whereby liability of breakage is avoided and facility in packing for transportation secured.

The invention therefore consists in the matters hereinafter described and referred to in the appended claims.

The invention is illustrated in the accompanying drawings, in which—

Figure 1 is a side elevation of the coffee-mill apparatus embodying my invention. Fig. 2 is a rear elevation, partly in section. Fig. 3 is a sectional view on the line 3 3 of Fig. 2. Fig. 4 is a sectional view on the line 4 4 of Fig. 3. Fig. 5 is a detail perspective of the receptacle-holding frame, and Fig. 6 is a detail view of the removable casting which forms part of the framework of the mill for supporting the guides for the receptacle-holding frame.

Referring to the drawings, the casing proper of the mill is made up of two parts, preferably castings A B, of which the portion A has a flat vertical center $a$, from which extend rearwardly two legs or brackets $b$, terminating in feet provided with screw-holes by means of which they may be securely attached to a wall or other object. The portion B of the shell is provided with ears $c$, registering with ears $d$ on the portion A, through which ears pass screw-bolts $e$ to hold the parts securely together.

The portions A and B have upwardly-extending vertical flanged portions C, having an internal groove D, adapted to embrace a rib $f$ in the bottom of the canister E. A washer or gasket being interposed between the entire inner surface of the flanges C and the outer surface of the lower neck F of the canister affords a firm clamping device for the canister, but prevents any liability of breakage, as would be likely to occur were no washer interposed or were there any bearing-surface at all of the metal flange on the neck of the canister.

The casting B has a central opening in which is journaled the shaft G of a bur H, opposed to the shell A, between which and itself the coffee is ground. This shaft is actuated by a suitable handle I. The portion B at its bottom has a semicircular flange K, connected with the body of the portion B by the web L and is cut out at $h$ to form a mouth for the channel $i$, through which the ground coffee passes out. The portion B also has cast with it the half-tubes $k$, which form, with the half-tubes $l$ on the casting M, secured by screw-bolt $m$ passing through the portions B and A, guiding-lugs, as hereinafter described. This casting M has a semicircular bottom plate N, forming, with the semicircular flange K on the portion B of the coffee-mill, a top for the ground-coffee receptacle. It has an ear $n$, adapted to be secured to the wall or other object.

O represents the bottom of the receptacle-holding frame, constructed with an upturned flange $o$ around a portion of its periphery, the open part $p$ being left to allow the glass or other receptacle P to slip in position readily.

Lugs $q$ are provided on diametrically opposite sides of the plate O, and to these lugs are secured the lower ends of rods which extend into the tubes formed by the parts $l$ $l$ and serve to support the holding-frame therefrom, springs R keeping the rods and plate O normally raised to hold the glass or other receptacle P firmly between the plate O and the flanges K M.

A washer *r* prevents withdrawal of the rods from the guides.

When it is desired to pack the apparatus for transportation, the glass or receptacle P may be removed, and the rods Q, with the plate O, are forced upwardly, thus reducing the length of the apparatus and permitting it to be packed in a limited space.

When it is desired to use the apparatus, the plate O is pulled down against the pressure of the springs R and the receptacle P inserted. When the frame is released, the receptacle is firmly secured, ready to receive the material fed to it from the mill.

The simplicity and effectiveness of the above-described apparatus will be readily apparent, and while I am aware that coffee-mills embodying the same general features of construction are well known, yet the details of the present apparatus, whereby the results arrived at are accomplished, are believed to be new and patentable.

Having thus described my invention, what I claim as new, and desire to secure by Letters Patent, is—

1. In a coffee-mill or like device, the combination with the mill-casing proper having the vertical flange with internal groove, a canister having its neck provided with a rib registering with said groove, and an intermediate gasket or washer between the flange and the said neck and covering said rib, and entirely preventing contact of the flange with the neck of the canister; substantially as described.

2. In a coffee-mill or the like, the combination of the shell and vertical back plate, means for securing them together, the back plate and shell each having upwardly-projecting semi-cylindrical flanges with an internal groove forming between them a circular canister-supporting opening, said canister having its neck inclosed between said flanges and having a rib, registering with the groove in the flanges, and a gasket or washer intermediate the flange and canister-neck and entirely encircling the latter and covering said rib; substantially as described.

3. In a coffee-mill or the like, the combination of the shell and the vertical back plate, means for securing said parts together around the canister-neck, and means for securing them to a wall or other object, and the removable casting attached to the shell and back plate and forming a portion of the cover-plate for the ground-coffee-holding receptacle, and a spring-supported receptacle-holding frame; substantially as described.

4. In a coffee-mill or the like, the combination with the mill proper, carrying the cover-plate for the ground-coffee receptacle, a holding-frame for said receptacle, spring-supported from said mill proper, and adapted to clamp said receptacle firmly against the cover-plate, said holding-frame being slidable with respect to the mill proper to facilitate packing; substantially as described.

5. In a coffee-mill or the like, the combination with the mill proper, carrying the cover-plate for the ground-coffee receptacle, the holding-frame for said receptacle having rods guided in lugs on the mill proper, springs acting upon said rods when they are withdrawn slightly to allow the placing of the receptacle on the frame, and means for permitting longitudinal movement of the rods, when the receptacle is removed to facilitate packing; substantially as described.

In testimony whereof I affix my signature in presence of two witnesses.

JOSEPH M. RIBERT.

Witnesses:
 FRANK G. BRERETON,
 GRACE P. BRERETON.